United States Patent Office 3,544,642
Patented Dec. 1, 1970

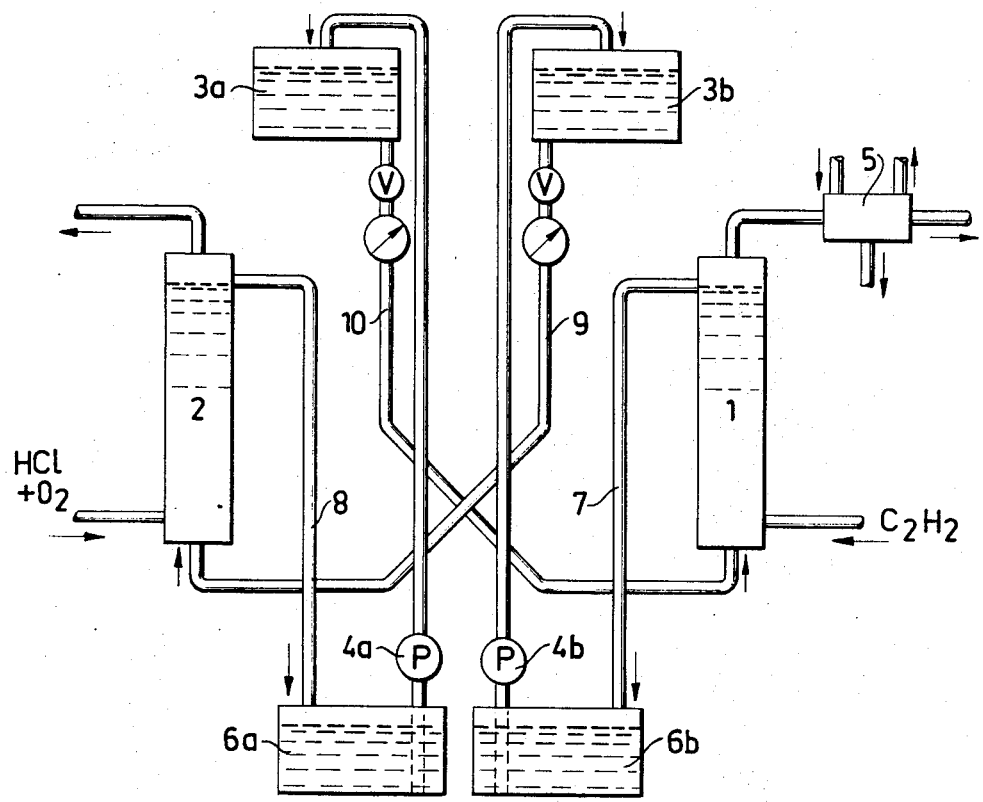

3,544,642
METHOD FOR THE PRODUCTION OF TRI-HALOGENATED AND TETRAHALOGEN-ATED ETHYLENE
Asbjörn Oppegaard and Jan Anders Dahlberg, Skoghall, Sweden, assignors to Uddeholms Aktiebolag, Uddeholm, Sweden, a corporation of Sweden
Continuation of application Ser. No. 473,030, Apr. 19, 1965. This application Mar. 11, 1969, Ser. No. 809,470
Claims priority, application Sweden, Aug. 20, 1964, 10,062/64
Int. Cl. C07c *21/02;* B01j *11/78*
U.S. Cl. 260—654                          2 Claims

ABSTRACT OF THE DISCLOSURE

In the method of forming a halogenated ethylene of the group consisting of bromoethylene and iodoethylene and intra-molecularly mixed halogenated ethylenes by passing acetylene through an aqueous reaction solution of copper halide containing cupric and cuprous ions, the cupric ions constituting more than 50 mole percent of the total copper content, at a pH value of 0–3 and a temperature of at least 60° C., the formation of free halogen in the solution is supressible by adding chloride ions to the solution.

---

This invention relates to a method for the production of halogenated ethylenes, patricularly tri- and tetra-halogenated ethylenes, by reactions between copper halides and acetylene.

In an application Serial No. 344,104 filed Feb. 11, 1964 in the names of Leonhard Tiganik and Jan Sven Ragnar Ohlson and assigned to the Uddeholms Aktiebolag of Uddeholm, Sweden, there is described a method for the production of tri- and tetra-chloroethylene by the reaction between copper chloride and acetylene.

It has now been found that a modification and improvement of the process described in said application can be applied for the production of the corresponding bromine, iodine, and fluorine compounds, particularly tri- and tetra-halogenated compounds.

The invention makes it possible to produce intramolecularly mixed compounds containing two or more of said halogens, or containing one or more of said halogens and chlorine.

It has now surprisingly been found that the halogenation of acetylene with cupric halides other than the chloride gives high yields of trihalogenated and tetrahalogenated ethylenes other than the chlorine derivatives if the acetylene is carried through a reaction solution containing the corresponding copper halide where the amount of cupric ions is 50–100 mole percent of the total copper amount, the pH-value of the reaction solution being kept at 0–3, preferably 1–2.5, and the temperature of the reaction solution being kept at at least 60° C. The pH-value is measured with a glass electrode. In all pH-measurements a sample of the reaction solution is diluted with an equal part of distilled water. Often the reaction solution has been so highly concentrated that dilution has been necessary for carrying out the measurement without crystallization. Of course it is improper to speak of pH in a solution having the high ionic strengths here used but the values obtained are well reproduceable.

In the reaction solution used the 1-valent copper may be oxidized to 2-valent copper by means of a halogen or a hydrogen halide and oxygen, for instance in the manner described in German Patent No. 1,094,734 and Swedish Patent No. 178,849. The possibility of utilizing a hydrogen halide as a halogen source is valuable, as hydrogen halides are obtained as by-products in many halogenation reactions.

Trihalogenated and tetrahalogenated ethylene are formed at a rate which depends upon the acidity of the solution and its content of cupric ions. For simultaneously obtaining a high reaction rate and a satisfactory yield of trihalogenated and tetrahalogenated ethylene we prefer to work at a pH-value of 1–2.5 and at a content of cupric ions which is 70–100 mole percent of the total copper content of the reaction solution. The most favorable range for the formation of trihalogenoethylene seems to lie at 70–90, and for the formation of tetrahalogenoethylene at 85–100, calculated as mole percent cupric ions.

The reaction can be carried out batchwise as well as continuously.

The reaction can be carried out in a conventional apparatus, for instance in a vessel with an agitator and a gas inlet, in a column, or a tube reactor. The reaction solution is charged in the reactor and the acetylene is introduced at a temperature of at least 60° C., suitably 80–130° C. in which case a pressure vessel is not needed. The reaction rate can be increased by increasing the temperature above 130° C. and operating in a pressure vessel. The reaction rate can be further increased by supplying the acetylene at such a rate as to produce in the reaction chamber a pressure which is higher than the pressure of saturated steam at the reaction temperature. The cupric halide is reduced to cuprous halide while the acetylene is halogenated.

Of particular interest is the possibility to carry out the reaction continuously. It is then possible to use the range of cupric ion content at which the reaction rate to the desired compound is largest. To make sure that the reaction compound does not crystallize as a result of possible cooling because of the precipitated cupric halide it is suitable to add halides of other metals, for instance the corresponding halide of potassium, sodium, lithium, magnesium, calcium, aluminium or zinc. Ammonium halide, also, has been found useful for producing the desired high solubility of the copper halide. These additives in certain cases also have an activating effect on the reaction. However, the additives limit the possibilities of working with very high copper halide contents. The latter may be desirable, when working continuously and in the range in which the cupric ion content is so high in relation to the cuprous ion content that the formed cuprous halide is held in solution by the halogen ions present. It is thus important for the technical realization of the reaction that the halide ion content is high. Thus, the total halide ion content in the solution is from 4 g. atoms per litre up to a solution which is saturated at the reaction temperature. Which cation to use for accomplishing this seems to be of a lesser importance.

The desired high halide ion content mentioned above involves a complication in the manufacture of bromine and iodine substituted ethylenes according to the invention. In a concentrated solution said cupric halides are readily decomposed to form cuprous halide and free halogen. The contact between acetylene and said free halogen involves a risk. It has been found however that the desired high halide ion content need not consist entirely of fluorine, bromine or iodine ions. A mixture containing chlorine ions produces the same result. As a matter of fact it is possible, according to the invention, to produce practically pure bromine substituted ethylenes, for instance, by passing acetylene through a solution in which less than 50% of the halide ion content consists of bromine ions. One of the following examples illustrates the use of a solution in which 95% of the halide ion content consists of chloride ions and only 5% consists of bromine ions. Apart from pure bromine substituted ethylenes a large quantity of mixed chlorobromo-ethylenes are formed. In a solution in which more than 50% of the halide ion content consists of chloride ions the decomposition of cupric bromide or iodide referred to above does not take place.

The invention permits the manufacture of intramolecularly mixed halogenated ethylenes of fluorine, chlorine, bromine and iodine.

The reactivity of the halides to acetylene increases in the order F-Cl-Br-I. If, therefore, a predetermined atomic ratio of the halogen substituents is desired in a mixed halogen ethylene the relative reactivity must be taken into consideration in the preparation of the catalyst solution.

If, for instance, a product is desired having an atomic ratio $X:Y=1$, X being a halogen atom having a lower atomic number than the halogen atom Y, the molarity of X must be higher than the molarity of Y in the catalyst solution. As an example, a copper-lithium chloride solution containing 7 mole percent of bromide may produce a product consisting of approximately 70 percent by weight of bromine substituted ethylenes. A similar copper-lithium chloride solution containing 7 mole percent of fluoride does not produce, under the same conditions, more than approximately 1 percent by weight of fluorine compounds. Consequently, the catalyst solution must have a high content of fluoride for giving a high-fluorinated product.

The invention is illustrated by the following examples.

EXAMPLE 1

A vertical tube having an inner diameter of 35 millimeters contained a 400 millimeters high column of an aqueous solution containing 1.5 mole $CuBr_2$ and 3.0 moles LiBr per liter. The solution was heated to 90° C., and acetylene of the same temperature was supplied through a gas distributor in the bottom of the tube at a rate of 1 liter (NPT) per hour. The reaction products leaving the top of the tube are collected in a cold trap at −70° C. The reaction was stopped when 16.6 grams of organic bromine compounds had been formed. Said organic bromine compounds consisted of 21% by weight tribromoethylene, 7% tetrabromomethylene, 71% 1,2-dibromoethylene, and 1% 1,1-dibromomethylene.

EXAMPLE 2

The test was carried out in a cylindrical container having a gas distributor in the bottom through which the acetylene was supplied and the gases leaving the container were passed from the top of the container to a condenser where the reaction product was collected. After the condenser a manometer and a reducing valve were connected. In the container was charged 200 ml. water solution containing 3 moles copper bromide and 6 moles lithium bromide per litre. 7 mole percent of the total copper amount was present as Cu (I) and the pH of the solution was 1.8. At 120° C. and an absolute pressure of 2.4 atm. acetylene was injected into the solution, the reducing valve being adjusted so as to release 1 litre gas per hour from the apparatus. After one hour 8.5 g. of product was obtained in the condenser. The composition was 43% tribromoethylene, 2% tetrabromoethylene and 55% bromoethylene. In a corresponding test at 90° C. and atmospheric pressure 3.3 g. of product was obtained having a composition of 60% tribromoethylene, 4% tetrabromoethylene and 36% bromoethylene.

EXAMPLE 3

An aqueous solution was prepared containing copper (II) chloride, copper (II) bromide, lithium chloride and hydrogen chloride in such quantities as to produce a solution containing 3 moles of copper and 6 moles of lithium per litre, having a pH-value of 1.9 and a molar ratio of chloride ions to bromide ions of 95 to 5. 350 millilitres of this solution was supplied into a cylindrical reaction vessel to a height of 400 millimeters. Acetylene was supplied through a gas distribution member in the bottom of the reaction vessel at a rate of 3 litres (NPT) per hour. The temperature of the solution was kept at 100° C. The gas leaving the top of the reaction vessel was passed to a condenser in which the reaction product was collected. After 1 hour the condenser had collected 14.7 grams of reaction product having the following composition:

| | Percent |
|---|---|
| Dichloroethylene | 12 |
| Chlorobromoethylene | 14 |
| Dibromoethylene | 2 |
| Trichloroethylene | 2 |
| Cisdichloromonobromoethylene | 13 |
| Cisdibromomonochloroethylene | 32 |
| Tribromoethylene | 17 |
| Tetrabromoethylene | 2 |
| | 64 |

In addition small quantities of other halogenated ethylenes were formed, such as vinylidene chloride and tetrachloroethylene.

EXAMPLE 4

For the manufacture of chloroethylenes and mixed chloroiodoethylenes a catalyst solution was prepared, consisting of 3 moles of $CuCl_2 \cdot 2H_2O$ and 6 moles of LiCl per litre of aqueous solution. Then a solution of hydrogen iodide was added, to give a molar ratio of iodide to chloride of 1 to 99. 350 millilitres of said solution was supplied into a cylindrical reactor to a height of 400 millimeters. Acetylene was supplied through a gas distribution member in the bottom of the reactor at a rate of 3 litres (NPT) per hour. The temperature of the solution was kept at 95° C. The test was stopped when 8.6 grams of organic halogenated compounds had left the top of the reactor. An additional quantity of 3 grams of reaction product could be obtained by subjecting the solution to a vacuum distillation. The reaction product contained dichloroethylene, trichloroethylene, tetrachloroethylene, and also chloroiodoethylene and cismonochlorodiiodoethylene in a total quantity of 25 percent by weight.

The accompanying drawing illustrates an apparatus for the manufacture of brominated ethylenes according to the invention on an industrial scale. Acetylene is supplied into the bottom of the reaction vessel 1, which contains the reaction solution. The gases from the top of the reaction vessel are passed to a condenser 5 in which the brominated ethylenes are condensed. The used reaction solution from the vessel 1 is passed over an overflow and through a conduit 7 to a tank 6b, is pumped from said tank by a pump 4b to a tank 3b, and flows from said tank through a conduit 9 to the bottom of the reaction vessel 2. Hydrogen bromide and oxygen, for instance air, is supplied to the bottom of said reaction vessel 2. The hydrogen bromide and the oxygen oxidizes the copper (I) chloride in the solution to form copper (II) chloride. The oxidized solution flows over an overflow and through a conduit 8 to a tank 6a, and is pumped by a pump 4a to a tank 3a from which it flows through a conduit 10 to the bottom of the reaction vessel 1.

In the illustrated apparatus the reaction solution is regenerated in a vessel separate from the reaction vessel. However, the reaction and the regeneration can take place in the same vessel, provided that the hydrogen bromide and the oxygen are introduced separate from the acetylene in a way making it impossible for any reaction between acetylene and oxygen to take place.

The various compounds produced may readily be separated by a distillation process.

I claim:

1. A method for the production of trihaloethylenes and tetrahaloethylenes containing bromine or iodine, which comprises passing acetylene through an aqueous solution containing a member of the group consisting of copper bromide and copper iodide, and also containing copper chloride, said solution having a pH of 0 to 3, at a temperature of at least 60° C., 50 to 100 mole percent of the copper being present as cupric ions and the chloride ions constituting more than 50 mole percent of the total halide ion content of the solution.

2. The method of claim 1, in which the total halide content in the solution is from 4 g. atoms per liter up to a solution which is saturated at the reaction temperature.

References Cited

UNITED STATES PATENTS

| | | | |
|---|---|---|---|
| 3,079,444 | 2/1963 | Jacobowski et al. | 260—654 |
| 3,184,514 | 5/1965 | Sennewald et al. | 260—654 |
| 3,197,515 | 7/1965 | Chassaing et al. | 260—654 |
| 3,301,910 | 1/1967 | Tiganik et al. | 260—654 |

LEON ZITVER, Primary Examiner

J. A. BOSKA, Assistant Examiner

U.S. Cl. X.R.

252—441